United States Patent

[11] 3,612,903

[72] Inventors James D. Lynn;
Marion J. Langan, both of Huntsville, Ala.

[21] Appl. No. 9,491
[22] Filed Feb. 9, 1970
[45] Patented Oct. 12, 1971
[73] Assignee Avco Corporation
Huntsville, Ala.

[54] FLOATING DIFFERENTIAL ELECTRONIC CHOPPER
11 Claims, 2 Drawing Figs.

[52] U.S. Cl. .......... 307/251, 307/261, 307/240
[51] Int. Cl. .......... H03k 17/60
[50] Field of Search .......... 307/251, 254, 261, 240

[56] References Cited

UNITED STATES PATENTS

| | | | |
|---|---|---|---|
| 3,381,140 | 4/1968 | Walsh | 307/254 X |
| 3,502,905 | 3/1970 | Bicking | 307/251 X |
| 3,388,300 | 6/1968 | Allmark et al. | 307/254 X |

*Primary Examiner*—John S. Heyman
*Attorney*—Charles M. Hogan

ABSTRACT: Herein described is a floating chopper comprising a pair of normally conductive N channel-junction field effect transistors, gated off in phase and a second pair of normally conductive N channel-junction transistors likewise gated off in phase, but with a phase delay of 180°, these four transistors being employed as switching devices alternately to present to a pair of output terminals the potentials existing at a pair of input terminals. There being a polarity reversal at these output terminals during each transition in the gating waveform, there appears at such output terminals a square waveform double in voltage magnitude to the potential differential between the input terminals. An impedance transformation network converts the derived square wave signals to low-impedance signals utilized to drive an output transformer. The chopper circuit is floating with respect to the system output ground and means is provided to balance the chopper circuit without creating a leakage path between the differential signal and the output ground.

INVENTORS.
JAMES D. LYNN
MARION J. LANGAN
BY Charles M. Hogan
ATTORNEY.

FLOATING DIFFERENTIAL ELECTRONIC CHOPPER

BACKGROUND AND OBJECTS OF THE INVENTION

The present invention provides means for accurately amplifying differential direct current and alternating current voltages in the microvolt region and converting the amplified signals to a unipolar output with respect to a system ground. The differential signals here employed as inputs may be at a very high common mode potential, designated by the triangular symbol at 10, of 500 volts, for example. Let it be further understood that the applied input voltages, although involving a differential in terms of microvolts, are both in the region of this common mode potential. The common mode potential may be equal to the average level of inputs A and B, for example. This common mode potential is limited only by the breakdown voltage of the driving transformers hereinbelow discussed.

One object of the invention is to minimize the loading or losses of the input signals which the floating chopper circuit utilizes.

It is also a primary object to maintain isolation between output and input of the differential electronic chopper.

Another object of the invention is to accomplish amplification of the differential signals with an accompanying drift rate (with respect to time) that represents an advance over the present state of the art.

Still another object of the invention is to provide a floating chopper which avoids ground loops.

The invention has, for further objectives, to minimize disturbances and undesirable variations occasioned by wide differences in ambient temperature conditions. This invention is characterized by negligible amplifier warmup time and by uniformity of operation even under very rapid and wide changes of ambient temperature.

Another feature of the invention is that the amplitude and energy content of the energy spikes that feed back into the input signal are significantly lower than those characterizing prior art electronic differential chopper circuits.

An important object of the invention is to provide a chopper circuit in which the gating signals are prevented from being capacitively fed back to the input signal circuits in a disturbing fashion.

A final specific object of the invention is to provide means for balancing the chopper circuit without creating a leakage path between the differential signal and output ground.

For further information relative to the general background of the invention, reference is made to: Elliott Gruenberg, "-Handbook of Telemetry and Remote Control" (New York: McGraw-Hill, 1967), pp. 4–35 through 4–44; Jacob Millman and Christos C. Halkias, "Electronic Devices and Circuits" (New York: McGraw-Hill 1967), pp. 357–362; Jacob Millman and Herbert Taub, "Pulse, Digital and Switching Waveforms" (New York: McGraw-Hill, 1965), pp. 647–663; Richard S. Burwen, an article entitled "Amplifiers for Strain-Gauges and Thermocouplers" in John M. Carroll ed., "Design Manual for Transistor Circuits" (New York: McGraw-Hill, 1961), pp. 257–259.

For a better understanding of the invention, together with other and further objects, advantages and capabilities thereof, reference is made to the following description of the accompanying drawings.

DETAILED DESCRIPTION OF THE INVENTION

Figure 1:
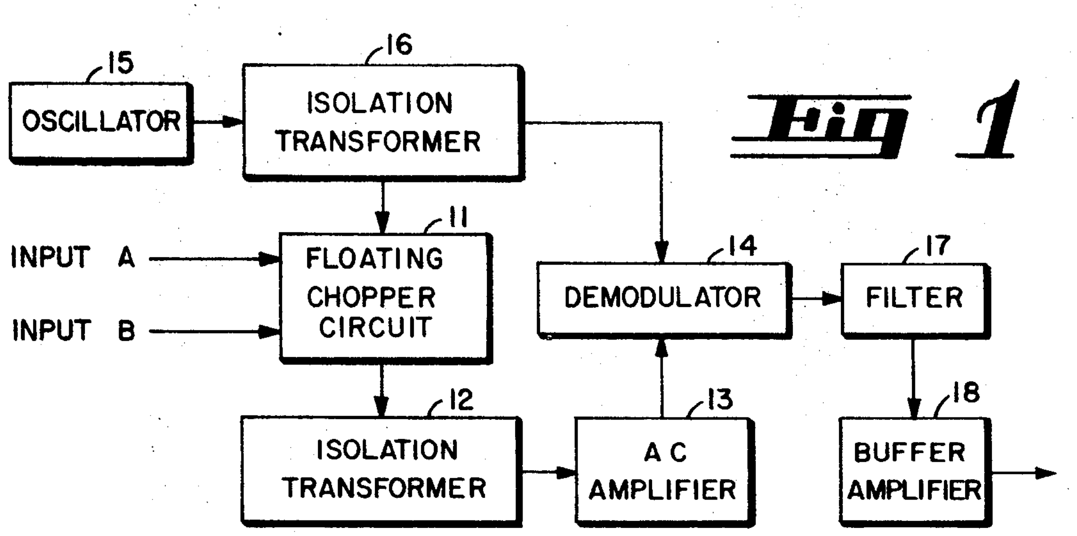
FIG. 1 is a block diagram of a typical amplifying system, generally of the prior art, in which a floating differential electronic chopper in accordance with the invention has particular utility

In the system of FIG. 1, differential direct current voltage inputs are applied to a floating differential electronic chopper circuit designated by the reference numeral 11. The chopper circuit, in accordance with the invention, is illustrated in FIG. 2 and it will be understood that the FIG. 2 chopper may constitute the contents of the block diagram 11, it being the function of FIG. 1 to indicate how the chopper of FIG. 2 is of utility in such a system.

Referring first to FIG. 1, the chopped square wave output of unit 11 is applied to an isolation transformer 12. The transformer output is amplified by alternating current amplifier 13 and the amplifier output is demodulated by synchronous demodulator 14.

Oscillator 15 supplies outputs via an isolation transformer 16 to both the floating chopper 11 and the demodulator 14. The oscillator is used to drive the primary winding of the oscillation transformer 16. That transformer has a plurality of secondary windings which provide power and excitation for the floating chopper 11 and the demodulator 14.

Figure 2:
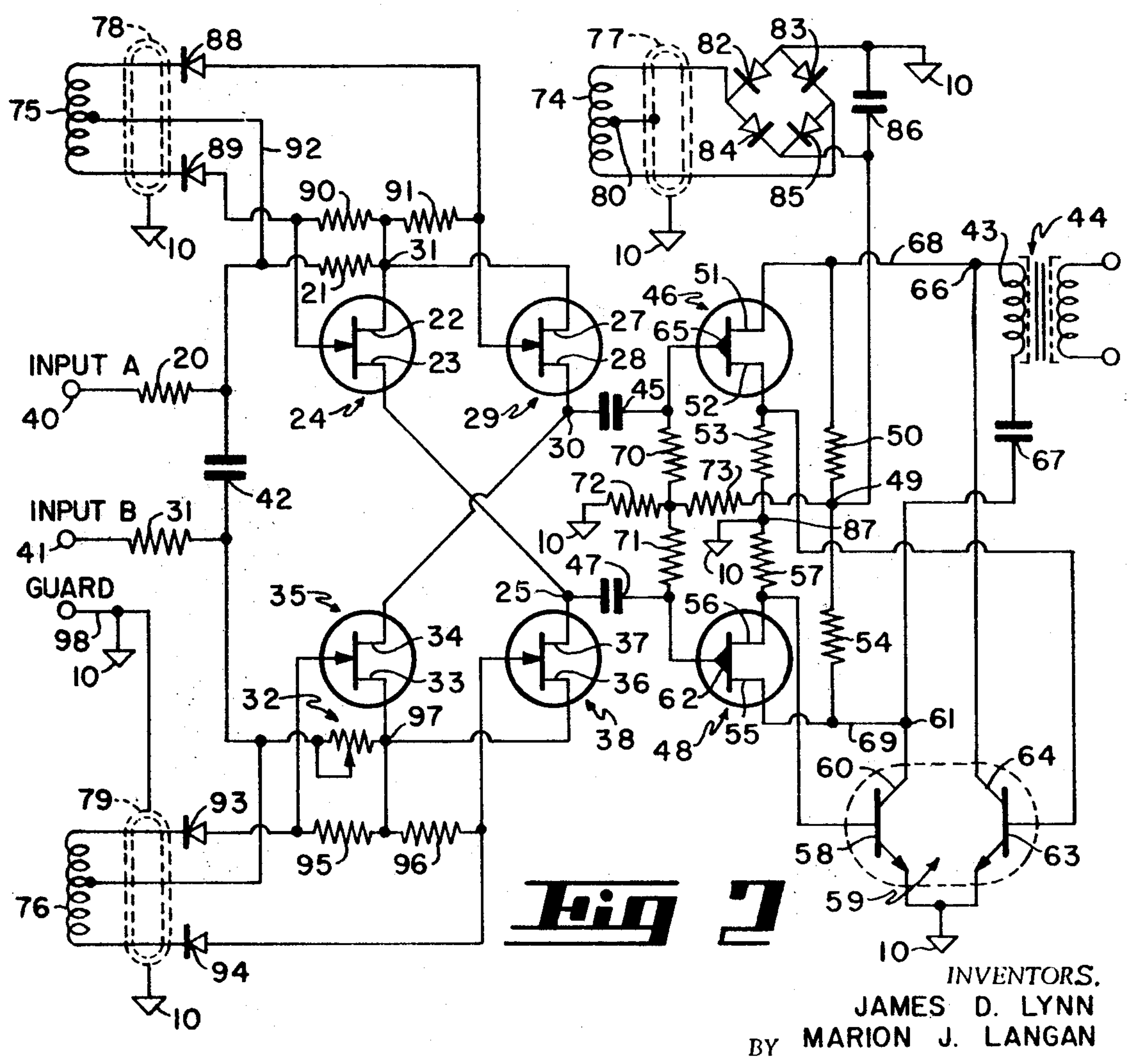
FIG. 2 is a circuit schematic of a preferred form of floating chopper in accordance with the invention.

The floating chopper circuit 11, shown in detail in FIG. 2, provides square waves of excitation to the primary of the isolation transformer 12. The amplitude of each of these square waves is directly proportional to the voltage differential between the inputs at A and B. The phase of this square wave with respect to that of oscillator 15 depends on the polarity of the potential difference between the inputs A and B.

The demodulator 14 compares the square wave output of the amplifier 13 with the phase of the excitation output of transformer 16, so as to derive a direct current potential, relative to a designated system ground, that is directly proportional to the difference in potential between inputs A and B. The polarity of this output potential is directly related to the polarity of the potential difference between the inputs at A and B. The output of the demodulator 14 is fed to a filter 17, which attenuates noise spikes and limits the upper frequency response of the system. The buffer amplifier 18 provides a low-impedance output drive.

It is well known in the art to chop a direct current or a low frequency signal, to amplify the resultant and then to recover the modulation components by demodulation and the present invention is described in this background, not for the purpose of claiming the overall system of FIG. 1, but for the purpose of defining an environment in which the invention is particularly well adapted. The subject matter claimed is disclosed in FIG. 2.

Parenthetically, the type numbers and voltages and frequencies and resistance and capacitance values and other parameters herein mentioned are disclosed by way of illustration (they having been found suitable in a working embodiment of the invention) and not limitation.

Referring now specifically to FIG. 2, there are shown a pair of input terminals 40 and 41, which are the proximate end leads of a twisted conductor pair (not shown). Terminal 40, hereinafter referred to as input A, is coupled, via series resistor 20 (51 ohms), shunt filter capacitor 42 (0.0068 microfarad), and series resistor 21 (1.1 ohm) to the sources of N-channel field effect transistors 24 and 29 (each type MPF 104 ). Similarly terminal 41, hereinafter referred to as input B, is coupled via resistor 31 (51 ohms), shunt filter capacitor 42, and resistor 32 (2ohms, variable) to the sources of N-channel field effect transistors 35 and 38 (each type MPF 104 ). The drains of transistors 24 and 38 are connected to a chopper output terminal 25 and the drains of transistors 29 and 35 are connected to a chopper output terminal 30.

As will be shown below, there appears across the chopper output terminals 25 and 30 a square wave that has an amplitude precisely equal to twice the amplitude of the potential difference between input A and input B.

The function of the circuitry to the right of terminals 25 and 30 in FIG. 2, and now described, is to convert the derived square wave signals into low-impedance signals for driving the primary 43 of output transformer 44. That is, the network between terminals 25 and 30 and transformer 44 constitutes a high-to-low impedance conversion network. Specifically terminal 30 is coupled, via blocking capacitor 45 (0.01 microfarad) to the gate of a P-channel field effect transistor 46 (type 2N4360). Terminal 25 is coupled via blocking capacitor 47 (0.01 microfarad) to the gate of P-channel field effect transistor 48 (type 2N4360).

Attention is now invited to a positive voltage supply terminal 49 which is in series with a resistance 50 (33,000 ohms), a source 51–drain 52 circuit of transistor 46, a resistor 53 (15,000 ohms) and the common mode potential point 10. Similarly the positive voltage terminal 49 is in series with resistor 54, the source 55–drain 56 circuit of transistor 48, resistor 57 (15,000 ohms) and point 10.

The operation of transistor 48 is now described. When this transistor is gated into conductivity by a positive going voltage on its gate then the voltage on its drain 56 falls. This drain is connected to the input base 58 of a dual high gain bipolar transistor 59 (type TD–101 ) so that the output collector 60 of this transistor goes positive under the assumed condition. Point 61, the collector lead from 60, follows point 62 in potential.

The other input base 63 of transistor 59 is connected to the drain output 52 of transistor 46 so that the output collector 64 of transistor 59 follows gate 65 of transistor 46 in potential. In other words, point 66, the collector lead from 64, follows point 65 in potential. More specifically, input 66 to transformer 44 follows chopper output terminal 30 in potential and input 61 to the transformer 44 follows chopper output terminal 25 in potential.

In series between the collector 60 of transistor 59 and the primary 43 of output transformer 44 is a capacitance 67 (0.47 microfarad).

The following negative feedback connections should be noted: First, conductor 68, effectively between the collector 64 of transistor 59 and the source electrode of transistor 46; Second, conductor 69, between collector 60 and source 55 of transistor 48.

It will be seen from the foregoing that the circuitry from the chopper output terminals 30 and 25 to the transformer primary input terminals 61 and 66 utilizes P-channel field effect transistors 46 and 48, together with the bipolar transistor unit 59 to provide a high-gain, closed loop, stabilized configuration to each input terminal of the output transformer, thus maintaining the integrity of the signal amplitude, while providing sufficient current drive to the transformer primary.

The output terminals 25 and 30 of the chopper look into a high-impedance network comprising series capacitors 45 and 47 and shunt resistors 70 and 71 (each 20 megohms). Connected between the junction of 70 and 71 and the common mode potential point is a resistor 72 (3 megohms). Connected between that junction and the positive voltage supply terminal 49 is a resistor 73 (1.5 megohms).

Attention is now directed to the source of positive direct current potential at point 49 and the sources of the square waves utilized for synchronous switching and demodulation.

A primary (now shown) is included in the isolation transformer 16 and is coupled to a suitable source of square waves 15 (FIG. 1). This primary may be at the system ground potential. The isolation transformer has three isolated secondaries, each center tapped, respectively designated at 74, 75 and 76, secondary 74 being part of the positive voltage supply and secondaries 75 and 76 pertaining, respectively, to the gating of the transistor groups 24, 29 and 35, 38, respectively. All of the groups of leads of these secondaries are shielded as shown at 77, 78 and 79 and the shields are connected to the common mode potential point 10.

The description now proceeds with the positive voltage source. Center tap 80 of secondary 74 is connected to shield 77. The outer leads of secondary 74 are connected to two of the corner points of a full wave rectifier comprising diodes 82, 83, 84 and 85 (each type 1 N914 ). The output terminals of this rectifier comprise terminal 49 and the common mode potential point 10. Across this output is a filter capacitor 86 (100 microfarads).

It will be noted that the supply source is referenced at its low-potential terminal to the common mode potential point 10, so that its high-potential terminal 49 approximates 25 volts, for example, relative to its low-potential terminal. It will be noted that the junction 87, between resistors 53 and 57, is returned to the common mode potential point.

Referring now to the means for applying square waves to the transistors 24 and 29, the leads of secondary 75 are connected to the cathodes of diodes 88 and 89 (each type 1N914) . The anodes are connected to a combination of series resistors 90 and 91 (each 200,000 ohms). The anode of diode 89 is connected to the gate of transistor 24 and the anode of diode 88 is connected to the gate of transistor 29. The junction between resistors 90 and 91 is connected to point 31, the source leads of transistors 24 and 29. The purpose of the diodes 88 and 89 is to cut off the positive going portions of square wave signals. It should be noted that the center tap of secondary 75 is connected series with the input terminal 40, via a conductor 92.

From the immediately preceding description the construction of the circuit comprising secondary 76, diodes 93 and 94 (each type 1N914), resistors 95 and 96 (each 200,000 ohms) will be understood. The anodes of diodes 93 and 94 are respectively connected to the gates of transistors 35 and 38. The junction of resistors 95 and 96 is connected to point 97, which, in turn, is connected to the sources of transistors 35 and 38.

The conductive element 18 designated by the legend "-Guard" symbolically represents a shield surrounding the twisted pair, the proximate leads of which constitute the inputs A and B. This shield is at the common mode potential of point 10.

It will be borne in mind that the twisted pair, connected to terminals 40 and 41, may originate at a remote location whereat a condition is being monitored. The monitoring equipment at that location may be disposed in a structure which is at a relatively high potential, say, 500 volts, and this is the common mode potential. Note that the center taps of secondaries 75 and 76 are referenced by connection, through resistors 20 and 31, respectively, to terminals 40 and 41, respectively, that the shields 77, 78 and 79 are connected to the point of common mode potential, that the power supply is referenced to the point of common mode potential, that the emitters of the bipolar transistor unit 59 and resistor 72 and point 87 are all returned to that point. The output or secondary of transformer 44 may be at the system ground potential. Thus, the invention achieves and maintains isolation between output and input.

OPERATION

The input A is in series via resistor 20 and resistor 21 with the source 22–drain 23 circuit of N-channel field effect transistor 24 and there is a conductive connection from drain 23 to point 25, so that, when the source-drain circuit of transistor 24 is conducting, simulating a pure resistance of 300 ohms, for example, then the potential of input A appears at point 25.

Similarly input A is in series, via resistors 20 and 21 with the source 27–drain 28 circuit of N-channel transistor 29, so that, when the source-drain circuit of transistor 29 is conducting, simulating a resistance value of, say, 300 ohms, then the potential of the input A appears at point 30. The two circuits 22, 23, 25 and 27, 28 and 30 are the equivalent of two on-off switches branching off from point 31, in series with input A. When negative waves are applied alternately to the gates of transistors 24 and 29, their source-drain circuits alternately cut off so that the potential of input A alternately appears at points 30 and 25.

The input B is in series, via resistance 31 and resistance 32, with the source 33–drain 34 circuit of N-channel field effect transistor 35. The source-drain circuit of transistor 35, when conducting, simulates a resistance of, say, 300 ohms, so that the potential of input B appears at point 30.

Input B is also in series, via resistor 31 and resistor 32, with the source 36–drain 37 circuit to transistor 38 in such manner that when the source-drain circuit is conducting, simulating a resistance of, say, 300 ohms, then the potential of input B appears at point 25.

It will be understood from the foregoing that when negative waves are applied alternately to the gates of transistors 35 and 38, then the potential at input B alternately appears at points 25 and 30.

Let one assume that input A is positive and input B is negative and that transistors 24 and 35 are nonconductive during the first cycle of a biphase square wave excitation signal and the transistors 29 and 38 are rendered nonconductive during the next half cycle, and that this alternation is indefinitely repeated. In this manner input A is alternately switched from point 30 to point 25 and so forth. Input B is alternately switched from point 25 to point 30 and so forth. Therefore, a square wave is derived at terminals 25 and 30 which has an amplitude equal to twice the potential difference between the input A and the input B. In this manner the circuit performs its function of generating a square waveform having an amplitude of double the voltage input differential.

The function of secondary 75 and its associated elements is to cause transistor 24 to be gated during half cycles of the square oscillations and transistor 29 to be gated during the alternate half cycles.

Similarly, the function of secondary 76 and its associated elements is alternately gate transistors 35 and 38. The gating action is such that the transistors 24 and 35 are gated in cophase fashion, during each first half cycle of the square wave excitation. The transistors 29 and 38 are also gated in cophase fashion, but during the succeeding half cycles, that is, the gating of transistors 29 and 38 lags by 180° with respect to the gating of transistors 24 and 35. The action is such that the potential at 41 is alternately gated to output terminals 25 and 30. Simultaneously, the potential at 40 is alternately gated to output terminals 30 and 25.

Capacitor 42, being in shunt relationship to both resistors 20 and 31, functions as a filter capacitor.

The secondaries 75 and 76 are so poled and related to the field effect switching transistors which they control in such fashion that the above described timing action is achieved. Let it be assumed that the excitation makes the cathodes of diodes 89 and 93 go negative at the same time. Transistors 24 and 35 are then gated off at the same time. At the end of a half cycle of excitation the cathodes of diodes 88 and 94 go negative at the same time and transistors 38 and 29 go nonconductive at the same time. The diodes 88, 89, 93 and 94 prevent positive going halves of the square wave excitation from passing to the gates of the field effect transistors under control.

A suitable frequency for the oscillation system of square wave excitation is 3 kilocycles. While the preferred embodiment of the invention is described as processing direct current differential signals, it is of equal utility in processing differential alternating current inputs at A and B having a frequency low compared to the excitation frequency.

This invention achieves a number of significant advantages. When transistor 24 puts a positive potential on point 25, for example, transistor 38 is open circuited and point 25 looks into an open circuit in the direction of this transistor. In the direction of the impedance transformation network, it looks into a high impedance. The same considerations are applicable to terminal 30 so that the differential signal input is not loaded.

Another advantage resides in the fact that the field effect transistors are free of offset voltages. Still another advantage results from the fact that noise spikes appearing across capacitor 42, caused by feed-through of gating signals, capacitively, to the sources of the switching transistors cause both terminals of capacitor 42 to be elevated by an equal amount so that such noise spikes have substantially no effect on the input signals.

The advantages of this invention are realized while employing relatively inexpensive components. The differential input signals may be the high common mode potentials, relative to a designated output system ground, with negligible effect on output accuracy. A high rejection ratio of common mode potentials is achieved. There is no warmup time and outputs have been found to be accurate even under conditions of rapid temperature changes from 0°to 50° C.

Since the chopper is completely floating with respect to the system output ground, it is necessary to balance the chopper circuit without creating a leakage path between the differential signal and output ground. This balancing is accomplished by developing small potentials across resistors 21 and 32 through the use of the chopper circuitry. These small potentials are essentially in series with the input signals and are provided by adjusting the value of resistor 32 with respect to resistor 21. The relative magnitudes of the input signals are adjusted to provide a balanced output when there is zero potential difference between inputs A and B. When transistor 24 is gated off a small current flows through resistors 21 and 90 back to the center tap of the isolated drive winding 75, thus producing a small potential across resistor 21, this resistor being small in resistance value compared to resistor 90. This potential is maintained by current flow through resistor 91 when the gate of transistor 29 is driven negatively. A potential is developed across variable resistor 32 in a similar manner through resistors 95 and 96, respectively, when the gates of transistors 35 and 38, respectively, are negative. Adjustment of resistor 32 determines the relative values of the small voltages inserted in series with the inputs and, therefore, accomplishes balancing of the circuit. The temperature coefficients of resistors 21 and 32 are closely matched.

While there has been shown and described what is at present believed to be the preferred embodiment of the invention, it will be understood by those skilled in the art that various changes and modifications may be made therein without departing from the scope of the invention as defined by the appended claims.

Having described our invention, we claim:

1. A system for converting a differential signal applied to a pair of input terminals into a square wave output having an amplitude which is a function of the differential comprising:

first and second input terminals;

first and second output terminals;

first and second field effect transistors having source-drain circuits between one of said input terminals and individual ones of said output terminals, third and fourth field effect transistors having source-drain circuits between the other of said input terminals and individual ones of said output terminals;

the source-drain circuits of the first and fourth transistors being connected to one output terminal;

the source-drain circuits of the second and third transistors being connected to the other output terminal;

each of said transistors having a gate;

means for applying oscillating excitation to the gates of said transistors in such manner that the source-drain circuits of the first and third transistors conduct during half cycles of the excitation and so that source-drain circuits of the second and fourth transistors conduct during alternate half cycles of excitation, whereby there appears at said output terminals a series of square waves which are double in amplitude with respect to said differential, and means for applying a signal, in the form of a voltage differential, to said input terminals.

2. A system in accordance with claim 1 in which the means for applying oscillating excitation comprises a source of square waves.

3. In a chopper circuit the combination of:

first and second active elements each having a gate and a controlled circuit which when nonconductive simulates an open circuit and when conductive constitutes a pure resistance, the controlled circuits of the first and second active elements being connected to branch off from a common input point and to provide two output points, third and fourth active elements of like character, each having a gate and a controlled circuit, the controlled circuits of the third and fourth active elements being connected to branch off from a common second input point, a connection from the controlled circuit of the third active element to one of said output points, a connection from the controlled circuit of the fourth active element to the other of said output points, means for applying a signal, in the form of a voltage differential, to said input points, and means for alternately first gating the first and third active elements, then gating the second and fourth active elements and maintaining this sequence so that there appears at the output points a series of waveforms functionally related in amplitude to a signal applied to the input points.

4. A system for converting a differential signal applied to a pair of input terminals into a square wave output having an amplitude which is a function of the differential comprising:

first and second input terminals;

first and second output terminals;

first and second field effect transistors having source-drain circuits between one of said input terminals and individual ones of said output terminals, third and fourth field effect transistors having source-drain circuits between the other of said input terminals and individual ones of said output terminals;

the source-drain circuits of the first and fourth transistors being connected to one output terminal;

the source-drain circuits of the second and third transistors being connected to the other output terminal;

each of said transistors having a gate;

and means for applying oscillating excitation to the gates of said transistors in such manner that the source-drain circuits of the first and third transistors conduct during half cycles of the excitation and so that source-drain circuits of the second and fourth transistors conduct during alternate half cycles of excitation, whereby there appears at said output terminals a series of square waves which are double in amplitude with respect to said differential, a first isolated transformer secondary having leads in circuit with the gates of the first and second transistors, a second isolated transformer secondary having leads in circuit with the gates of the third and fourth transistors, said transformer secondaries being provided with center taps severally connected in series with said input terminals, and individual diodes connected in circuit between the leads and the associated gates, for passing only the gating portions of the square wave excitation.

5. A system in accordance with claim 4, an output transformer, and high-to-low impedance transformation means coupled between said output terminals and said output transformer.

6. A system in accordance with claim 5 in which the impedance transformation means comprises:

fifth and sixth field effect transistors, means for capacitively coupling said output terminals to the individual gates of the first and sixth transistors;

a source of direct current voltage, a gate resistor pair for the fifth and sixth transistors;

a drain resistor pair for the fifth and sixth transistors;

a source resistor pair for the fifth and sixth transistors;

a source resistor pair for the fifth and sixth transistors;

all of said pairs being in symmetry, means for returning the junctions of each of said pairs of gate and drain and source resistors to a point of common mode potential, and means for symmetrically coupling the drains of said fifth and sixth transistors to said output transformer.

7. A system in accordance with claim 6 in which the last-mentioned means comprises a bipolar dual transistor having emitters returned to said point of common mode potential, collectors separately coupled to said output transformer, and bases connected to the drains of the fifth and sixth transistors.

8. A system in accordance with claim 7 and negative feedback connections from said collectors to the sources of said fifth and sixth transistors.

9. A system in accordance with claim 8 in which the direct current voltage source comprises a third center tapped isolated transformer secondary coupled to a full-wave rectifier and filter system having a reference terminal connected to said common mode potential point.

10. A system in accordance with claim 9 in which there are a filter capacitor across the input terminals and a blocking capacitor in series with the primary of said output transformer.

11. A system in accordance with claim 10 and means for inserting balancing voltages between said input terminals and said source-drain circuits, said means comprising a first pair of resistors across said first secondary, a second pair of resistors across said second secondary, a fixed balancing resistor inserted between the sources of the first and second transistors and the center tap on the first secondary, and a variable balancing resistor inserted between the sources of the third and fourth transistors and the center tap on the second secondary.